United States Patent [19]

Miller

[11] Patent Number: 4,530,166
[45] Date of Patent: Jul. 23, 1985

[54] PREHEATING PARTICULATE MATERIAL

[75] Inventor: David M. Miller, Lancaster, Ohio

[73] Assignee: Owens-Corning Fiberglas Corporation, Toledo, Ohio

[21] Appl. No.: 584,028

[22] Filed: Feb. 27, 1984

[51] Int. Cl.³ ............................................. F26B 3/24
[52] U.S. Cl. ........................................ 34/39; 34/135; 432/215; 65/27; 501/69
[58] Field of Search .......................... 65/30.14, 33, 27; 501/4, 7, 63, 66, 67, 68, 69, 70; 432/15, 218, 215, 112; 34/135, 39

[56] References Cited

U.S. PATENT DOCUMENTS

| 2,920,071 | 1/1960 | Stookey | 106/39 |
| 3,157,522 | 11/1964 | Stookey | 106/52 |
| 3,907,577 | 9/1975 | Kiefer et al. | 65/30.14 |
| 4,319,903 | 3/1982 | Hohman et al. | 65/27 |

Primary Examiner—Larry I. Schwartz
Attorney, Agent, or Firm—Ronald C. Hudgens; Robert F. Rywalski; Patrick P. Pacella

[57] ABSTRACT

A process for preheating particulate material is disclosed. The process also may be used for drying the particulate. The invention uses a heat exchange method that preferably employs furnace exhaust gases. In one embodiment, glass batch is preheated before being fed to a melting furnace. The invention involves the use of glass-ceramic materials as the heat exchange media.

13 Claims, 2 Drawing Figures

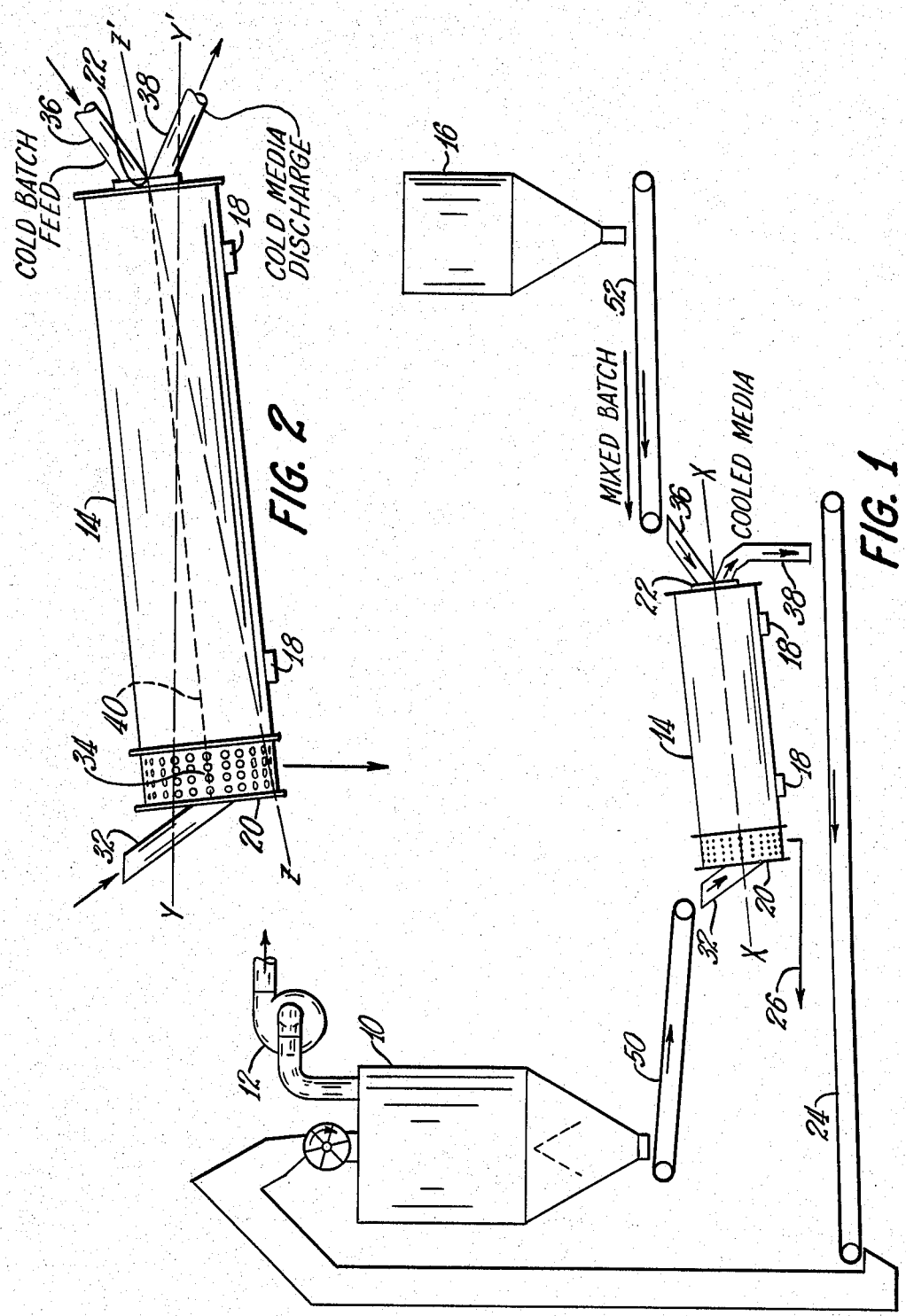

PREHEATING PARTICULATE MATERIAL

TECHNICAL FIELD

This invention relates to a process for preheating particulate material. The process also may be used for drying the particulate. In one embodiment, glass batch is preheated before being fed to a melting furnace.

BACKGROUND ART

Methods are known in the art for particle-particle heat exchange between granular materials and spherical metal balls of different temperatures. In one embodiment, the process is used for heating food products. The food products and metal balls are allowed to exchange heat in a rotating drum. This method allows the exchange of large quantities of heat economically and uniformly and without contamination from residues of the heat transfer medium.

Another embodiment of this process has been developed for preheating glass batch. This method employs particulate glass batch raw materials and media of larger particle size. The glass batch moves in direct and immediate physical contact with the heated media in a container. Preferably, the media is spherical. The media can be heated with an external burner or preferably heated directly or indirectly with exhaust gases from a glass melting furnace.

Durable heat transfer media formed of glass batch agglomerates, glass, ceramic, steel, stainless steel, aluminum, gravel or the like have been suggested for use in this preheating process. Alumina spheres have been found to be particularly useful. This material has shown very good results as the heat transfer media for preheating glass batch—its thermal and mechanical properties are adequate. However, as with any materials used in this manner, there will evidently be a carryover of fragments of media into the furnace by way of the preheated material. The alumina, being a refractory material, is very difficult to melt and, therefore, ends up as a stone in the finished article. This will cause serious quality problems and is unacceptable for most applications especially in glass products, e.g., container, window glass, tumblers, etc.

DISCLOSURE OF INVENTION

This invention involves the use of glass-ceramic materials, such as spodumene, as the heat exchange media for the preheating or drying process. The advantages of glass-ceramic materials are their almost ideal polycrystalline structure; i.e., fine grain size (0.5 to 2 micron), uniformity of grain size, random orientation of grains and relative freedom from pores and imperfections. More specifically, glass-ceramic materials with low to moderate thermal expansion coefficients (0 to $30 \times 10^{-7}/°C.$ from 25° to 400° C.) and good mechanical strength (MOR 15,000 to 30,000 psi) are desirable to meet the thermal and mechanical property requirements of the heat exchange process. Another important consideration, however, is that a glass-ceramic material such as B-spodumene is much more readily taken into solution in silicate glass melts than is alumina, $Al_2O_3$. For example, at 2600° F., B-spodumene is 60 to 80 times faster dissolving in a container glass melt than is alumina.

BRIEF DESCRIPTION OF THE DRAWINGS

FIG. 1 is a flow diagram including a rotary drum heat exchanger.

FIG. 2 illustrates the rotary drum heat exchanger in more detail.

BEST MODE OF CARRYING OUT INVENTION

Several glass-ceramic materials or combinations of such may provide an acceptable heat exchange material for the process. These materials include: Celsian ($BaO.Al_2O_3.2SiO_2$), Pollucite ($Cs_2O.Al_2O_3.4SiO_2$), Corderite ($2MgO.2Al_2O_3.5SiO_2$) and Spodumene ($Li_2O.Al_2O_3.4SiO_2$).

Compositions containing substantial amounts of $Li_2O$ and the crystalline products resulting therefrom, contain betaspodumene ($Li_2O.Al_2O_3.4SiO_2$) which has a thermal expansion coefficient of practically zero. By using such glasses, it is possible to produce ceramics having very low thermal expansion coefficients.

Glasses containing BeO, e.g., ($3BeO.Al_2O_3.6SiO_2$), also has a low thermal expansion coefficient. Such products have low expansion coefficients, high deformation temperatures and high mechanical strength and hardness.

Compositions containing substantial amounts of MgO and their crystalline products contain alpha-cordierite ($2MgO.2Al_2O_3.5SiO_2$) which also has a low thermal expansion coefficient, high mechanical strength, hardness, and deformation temperatures.

Compositions containing substantial amounts of CaO and their crystalline products contain anorthite ($CaO.Al_2O_3.2SiO_2$) which has an intermediate thermal expansion coefficient. The mechanical strength, hardness and deformation temperature of these glass-ceramics are substantially higher than those of the parent glass.

Compositions containing substantial amounts of ZnO and their crystalline products contain primarily zinc spinel or gahnite ($ZnO.Al_2O_3$) and also, in some compositions, willemite ($2ZnO.SiO_2$). These products have high deformation temperatures and high hardness and abrasion resistances.

A large number of such glass compositions amenable to the invention may be defined and classified as consisting essentially of the four components, $SiO_2$, $Al_2O_3$, $TiO_2$, and one or more of the basic metal oxides, $Li_2O$, BeO, MgO, CaO, ZnO, SrO, CdO, BaO, PbO, MnO, FeO, CoO, and NiO. The term "basic metal oxides" as used herein refers to glass-network modifiers which are capable of combining with $SiO_2$ and other network formers to form silicate and other glasses.

The crystalline products obtained from glasses containing mixtures of 2 or more of the above recited basic metal oxides generally have properties intermediate of those of the crystalline products resulting from glasses individually containing the same basic metal oxides. Moreover, the maximum amount of basic metal oxide, which will produce composition capable of being melted and cooled as a glass, may, in some instances, be substantially increased by combining 2 or more of the basic metal oxides in a single composition. Similarly, the range of compositions capable of being melted and cooled to form glasses can be broadened by the addition of other compatible metal oxides, particularly the fluxes $Na_2O$, $K_2O$ and $B_2O_3$, in limited amounts.

Compositions consisting of $SiO_2$, $Al_2O_3$ and $TiO_2$ with or without the above basic metal oxides also may be used in this invention. Such glasses are relatively hard glasses and a melting temperature of 1650° C. or more is required to melt them. After being converted to crystalline ceramics, compositions containing only $SiO_2$, $Al_2O_3$ and $TiO_2$ generally have higher deformation temperatures than those ceramics containing the basic metal oxides.

Many of these glass ceramics are described in U.S. Pat. No. 2,920,971 issued on Jan. 12, 1960.

The following glasses and corresponding glass-ceramic (B-spodumene) materials have been found particularly useful.

|  | Weight Percent, % |
|---|---|
| $SiO_2$ | 55–75 |
| $TiO_2$ $ZrO_2$ | 2.5–7.0 |
| $Li_2O$ | 2–15 |
| $Al_2O_3$ | 12–36 |
| ZnO MgO As$_2$O$_3$ F$_2$ | <5 |
| $Li_2O/Al_2O_3$ ratio | 0.1–0.6 |
| $SiO_2 + TiO_2 + Li_2O + Al_2O_3$ | >95% |

The following glasses have been found to be especially useful when cerammed to B-spodumene solid solution crystalline materials.

|  | 1 | 2 | 3 | 4 | 5 |
|---|---|---|---|---|---|
| $SiO_2$ (Wt %) | 67.4 | 67.1 | 64.9 | 62.3 | 59.1 |
| $Al_2O_3$ | 20.7 | 21.5 | 23.4 | 25.7 | 28.4 |
| $Li_2O$ | 3.5 | 3.71 | 4.04 | 4.43 | 4.90 |
| MgO | 1.6 | 1.59 | 1.58 | 1.58 | 1.56 |
| ZnO | 1.2 | 1.28 | 1.27 | 1.26 | 1.25 |
| $TiO_2$ | 4.9 | 4.85 | 4.82 | 4.80 | 4.76 |
| $As_2O_3$ | 0.4 | 0 | 0 | 0 | 0 |
| $F_2$ | 0.2 | 0 | 0 | 0 | 0 |
| $Na_2O$ | 0.1 | 0 | 0 | 0 | 0 |
| $Li_2O/Al_2O_3$ ratio | 0.17 | 0.17 | 0.17 | 0.17 | 0.17 |
| $SiO_2 + TiO_2 + Li_2O + Al_2O_3$ | 96.5 | 97.16 | 97.16 | 97.23 | 97.16 |
| Ceram: | at 750° C./ 2 HR at 1150° C./ 2 HR @ 300° C./ 1 HR | 822° C./ 2 HR 1162° C./ 2 HR @ 300° C./ 1 HR | 822° C./ 2 HR 1162° C./ 2 HR @ 300° C./ 1 HR | 790° C./ 2 HR 1152° C./ 2 HR @ 300° C./ 1 HR | 822° C./ 2 HR 1162° C./ 2 HR @ 300° C./ 1 HR |
| Visual: | Opaque | Opaque | Opaque | Opaque | Translucent |
| Crystalline Phase: | White B-Spodumene$_{ss}$ Rutile (trace) | Off-White B-Spodumene$_{ss}$ Rutile (trace) | Off-White B-Spodumene$_{ss}$ | White B-Spodumene$_{ss}$ | Gray B-Spodumene$_{ss}$ |
| TEC (0 to 400° C.) ($\times 10^{-7}$/C.°): | 5.8 | 2.6 | 4.4 | 4.7 | 8.8 |
| Liquidus: | 2423° F. | 2498° F. | 2501° F. | 2566° F. | 2600° F. |
| Density (gm/cc): | 2.528 |  |  |  |  |

A summary of work performed on the melting, forming (marble) and ceramming properties of glass #1 to attain the desired thermal and mechanical characteristics of the resulting glass ceramic is given as follows:

BATCH MATERIALS

The glass was produced by mixing and melting the given raw materials at 2950° F. for 16 hours.

| Raw Material | Weight (grams) |
|---|---|

| sand | 404.60 |
|---|---|
| aluminum oxide | 125.00 |
| zinc oxide | 7.26 |
| magnesium oxide | 9.72 |
| lithium carbonate | 52.70 |
| sodium silica fluoride | 2.18 |
| titanium oxide | 29.10 |
| arsenic trioxide | 2.40 |
|  | 632.96 grams |

| GLASS VISCOSITY DATA | |
|---|---|
| Log Viscosity | |
| 2.5 | 2973° F. |
| 3.0 | 2754° F. |
| 3.5 | 2571° F. |
| 3.75 | 2490° F. |
| 4.0 | 2423° F. (liquidus) |

Annealing Temperature: Approximately 1250° F.
Liquidus: 2423° F. (mullite primary phase)

GLASS CERAMMING

The glass is nucleated and cerammed to produce the resulting B-Spodumene glass-ceramic material.

Ceramming Sequence—Titanium oxide ($TiO_2$) is the nucleating agent for the glass-ceramic. Aluminium tetaniate crystals are believed to precipitate from the glass to form the initial nuclii from which a B-eucryptite solid solution crystalline phase grows (eucryptite: $Li_2O$—$Al_2O_3$—$2SiO_2$). The nucleation temperature is in the 700° C.—825° C. range. The nucleation time usually ranges from one to three hours. The B-eucrytite solid solution phase is stable up to approximately 900° C. to 1050° C. at which time it converts to B-spodumene solid solution ($Li_2O$—$Al_2O_3$—$4SiO_2$). The ceram temperature is the temperature at which the nucleated material is held for a period of time (one to four hours) to allow for complete conversion of crystalline phase to B-spodumene. Grain growth is also occurring during the ceramming process. The B-spodumene usually has grains in the 0.5 to 2 μm range.

Also, at approximately 1000° C., rutile (TiO$_2$) may start to precipitate from the B-spodumene solid solution and is present as a minor phase in the final ceramic.

Physical Properties of B-spodumene Glass-Ceramics

Thermal Expansion Coefficient: Average TEC of 1.0×10$^{-7}$ to 15×10$^{-7}$/C.° (0 to 400° C.).
Density: 2.42 to 2.57 gm/cc.
Modulus of Rupture: 12,000 to 22,000 psi.
Young's Modulus, E: 12 to 15×10$^6$ psi.
Hardness: 600 to 700 on Knoop scale.
Specific Heat (Cal/gm-C.°): 0.195 at 25° C., 0.286 at 500° C.
Thermal Conductivity Cal/(cm) (sec)(°C.)×10$^4$: 48 at 0° C., 51 at 100° C., 55 at 400° C.
Porosity: Zero.

DISSOLUTION RATE

Rate studies were made comparing spodumene glass-ceramic and 94% alumina. The glass was a typical flint container composition as follows.

| Container Glasses (Wt. %) | |
| --- | --- |
| SiO$_2$ | 74.44% |
| Al$_2$O$_3$ | 1.01 |
| CaO | 5.43 |
| MgO | 3.72 |
| Na$_2$O | 15.39 |
| Total | 99.99% |

Assuming spherical particles, the relative dissolution times as a function of temperature are:

| Temperature | Diameter | Time Spodumene | Time Alumina |
| --- | --- | --- | --- |
| 2600° F. | 0.4 mm | 4.2 min. | 5½ hr. |
| | 1.6 mm | 16.8 min. | 21⅓ hr. |
| | 1.0 cm | 1¾ hr. | 5.6 days |
| 2400° F. | 0.4 mm | 17 min. | 3.3 days |
| | 1.6 mm | 1.15 hr. | 13 days |
| | 1.0 cm | 7.1 hr. | 82 days |

The advantages of the spodumene glass ceramic is that it has a low expansion coefficient (6×10$^{-7}$/C.°) with good strength (20,000 psi) which allows it to meet the thermal and mechanical properties of the process. Another important consideration, however, is that it is much more soluble in soda-lime-silicate glass melts than is alumina. (At 2600° F., spodumene is 60 to 80 times more soluble in container glass than alumina).

INDUSTRIAL APPLICABILITY

The heated media is introduced into one end of a container such as a cylindrical drum rotatable on an inclined axis. Concurrently, the particulate material to be heated is introduced into the other end of the drum. The hot media flows in one general overall direction through the drum, and the particulate flows in a generally opposite direction through the drum. The media serves to heat the particulate, and the particulate serves to cool the media. The cooled media is recycled back to the preheat hopper and the preheated particulate may be fed to a furnace feed mechanism.

In FIG. 1, heat transfer media may be heated with flue gases at a temperature normally ranging from 482 to 677° C. from a glass melting furnace (not shown) in preheat hopper 10. The flue gases are introduced into the lower part of preheat hopper 10, and the media is introduced into the upper part of preheat hopper 10. The flow of gases and media are countercurrent to each other. The media exits through the bottom of preheat hopper 10, and the flue gases exit through the top of preheat hopper 10. A blower or fan 12 is shown to pull the exhaust gases from preheat hopper 10 or to maintain a negative pressure in the hopper. The media may be heated to a temperature at or near the temperature of the flue gases.

The hot media then is fed to one end of heat exchange drum 14 by a conveyor 50. Concurrently, particulate glass batch raw materials are fed by conveyor 52 and a screw feeder (not shown) from mixed batch storage 16 to the other end of drum 14. Drum 14 is rotated around the axis x—x by a motor and drive (not shown).

Centrally arranged stationary end parts at 20 and 22 form inlet and outlet conduits communicating with the inside of the drum. After the cooled media is discharged from the drum, it is returned to preheat hopper 10 via conveyor 24. Hot mixed batch is fed to a glass melting furnace via stream 26.

FIG. 2 shows drum 14 in more detail. Hot media is fed to drum 14 through conduit 32, and hot batch is discharged through screen 34. Cold batch is fed through conduit 36, and cold media is discharged through conduit 38. The rotation of the drum and baffles 40 cause the media and batch to tumble in direct immediate physical contact with each other.

The cylindrical container is inclined at an angle. In the prefered embodiment, the batch charging end of the container is elevated above the media charging end. While the angle can vary widely, generally the drum will form an acute angle with a horizontal line no greater than about 45° and typically less than 15°. Preferably, the angle is less than 5°.

In another embodiment, the media charging end of the container may be elevated above the batch charging end. The cold media then is discharged at the lower end of the container through means that allows the media to pass freely through but that prevents the batch from passing. The batch moves towards the upper end for discharge.

In order to bring the batch in direct contact with the hot media, an arrangement of baffles may be attached to the interior of the container. Baffles 40 each are typically a series of baffles (3 or 4 in number) around the circumference of the drum. These baffles are 2 to 3 inches wide. These baffles usually are bolted to the walls of the drum and extend the length of the drum. All of the baffles in combination with the rotation of the drum, aid in tumbling the media and batch in direct contact with each other. Typically, cold batch is fed through conduit 36 into drum 14 with a screw feeder (not shown) that extends into the interior of the drum. This extension into the drum aids in reducing the amount of batch that may leave the drum with media through conduit 38. In one embodiment, hot media is fed through conduit 32 with a screw feeder (not shown) that extends into the interior of the drum.

While the tumbling of the media and batch occurs through agitation from the baffles and rotation of the drum, movement of the batch and media through the drum is believed to occur in the following manner. The media and batch form gradients in the drum and generally flow downhill in a direction along the gradients and in opposite directions. The batch and media tumble and move over each other as they flow from the high end to the low end of the pile of material in the container. FIG.

2 illustrates the flow of media and batch within the drum. The media flows in the general direction of axis Y—Y' from left to right, and the batch flows in the general direction of axis Z—Z' from right to left.

The Y—Y' axis and the Z—Z' axis reflect the mass of media or batch respectively present at that point of the drum. As the media move from left to right in the drum, less media is present in the drum. More batch mass is present at the right end of the drum than at the left end. While each axis is drawn in static form, the batch and media are intermixed and tumbling in the drum. At the left end of the drum batch typically is mixed with the media. At the right end of the drum, batch often covers the media. The Y—Y' axis in FIG. 2 generally extends from above conduit 32 to near the bottom of conduit 38. The Z—Z' axis in FIG. 2 usually extends from the bottom of conduit 36 to the bottom of screen 34.

I claim:

1. A method of heating particulate material including the steps of:
   heating glass-ceramic heat transfer media, larger in particle size than the particulate material wherein the glass-ceramic media has a low thermal expansion coefficient and is readily soluable in silicate glass melts;
   introducing the hot media into a rotatable container;
   introducing particulate material into the container;
   rotating the container, during rotation the material and media tumbling and moving over each other in heat transfer relationship; and
   moving the material and media through the container for discharge.

2. A process according to claim 1 wherein the glass ceramic media is made from compositions comprising $SiO_2$, $Al_2O_3$ and $TiO_2$ and one or more basic metal oxides.

3. A process according to claim 2 wherein the basic metal oxides are $Li_2O$, BeO, MgO, CaO, ZnO, SrO, CdO, BaO, PbO, MnO, FeO, CoO or NiO.

4. A process according to claim 1 wherein the glass-ceramic media has a thermal expansion coefficient of practically zero.

5. A process according to claim 1 wherein the glass ceramic media is sufficiently soluble in silicate glass melts so that few or no stoves appear in resulting glass.

6. A process according to claim 1 wherein the glass-ceramic media is made of a solid solution of B-spodumene, Celsian ($BaO \cdot Al_2O_3 \cdot 2SiO_2$), Pollucite ($Cs_2O \cdot Al_2O_3 \cdot 4SiO_2$) or Cordierite ($2MgO \cdot 2Al_2O_3 \cdot 5SiO_2$).

7. A process according to claim 1 wherein the glass-ceramic media is made of spodumene having a composition ranging by weight from:

|  | Weight Percent, % |
| --- | --- |
| $SiO_2$ | 55–75 |
| $TiO_2$ | 2.5–7.0 |
| $ZrO_2$ |  |
| $Li_2O$ | 2–15 |
| $Al_2O_3$ | 12–36 |
| ZnO |  |
| MgO |  |
| $As_2O_3$ | <5 |
| $F_2$ |  |
| $Li_2O/Al_2O_3$ ratio | 0.1–0.6 |
| $SiO_2 + TiO_2 + Li_2O + Al_2O_3$ | >95% |

8. A process acccording to claim 1 wherein the glass ceramic media is made of a solid solution of B-spodumene having the formula:

|  | Weight Percent |
| --- | --- |
| $SiO_2$ | 67.4 |
| $Al_2O_3$ | 20.7 |
| $Li_2O$ | 3.5 |
| MgO | 1.6 |
| ZnO | 1.2 |
| $TiO_2$ | 4.9 |
| $As_2O_3$ | 0.4 |
| $F_2$ | 0.2 |
| $Na_2O$ | 0.1 |
| $Li_2O/Al_2O_3$ ratio | 0.17 |
| $SiO_2 + TiO_2\ Li_2O + Al_2O_3$ | 96.5 |

9. A process according to claim 1 wherein the glass ceramic media is made of a solid solution of B-spodumene having the formula:

|  | Weight Percent |
| --- | --- |
| $SiO_2$ | 67.1 |
| $Al_2O_3$ | 21.5 |
| $Li_2O$ | 3.71 |
| MgO | 1.59 |
| ZnO | 1.28 |
| $TiO_2$ | 4.85 |
| $As_2O_3$ | 0 |
| $F_2$ | 0 |
| $Na_2O$ | 0 |
| $Li_2O/Al_2O_3$ ratio | 0.17 |
| $SiO_2 + TiO_2 + Li_2O + Al_2O_3$ | 97.16 |

10. A process accordiing to claim 1 wherein the glass ceramic media is made of a solid solution of B-spodumene having the formula:

|  | Weight Percent |
| --- | --- |
| $SiO_2$ | 64.9 |
| $Al_2O_3$ | 23.4 |
| $Li_2O$ | 4.04 |
| MGO | 1.58 |
| ZnO | 1.27 |
| $TiO_2$ | 4.82 |
| $As_2O_3$ | 0 |
| $F_2$ | 0 |
| $Na_2O$ | 0 |
| $Li_2O/Al_2O_3$ ratio | 0.17 |
| $SiO_2 + TiO_2 + Li_2O + Al_2O_3$ | 97.16 |

11. A process according to claim 1 wherein the glass ceramic media is made of a solid solution of B-spodumene having the formula:

|  | Weight Percent |
| --- | --- |
| $SiO_2$ | 62.3 |
| $Al_2O_3$ | 25.7 |
| $Li_2O$ | 4.43 |
| MgO | 1.58 |
| ZnO | 1.26 |
| $TiO_2$ | 4.80 |
| $As_2O_3$ | 0 |
| $F_2$ | 0 |
| $Na_2O$ | 0 |
| $Li_2O/Al_2O_3$ ratio | 0.17 |
| $SiO_2 + TiO_2 + Li_2O + Al_2O_3$ | 97.23 |

12. A method of heating or drying particulate material for use in a process resulting in hot exhaust gases including the steps of:

heating glass-ceramic heat transfer media, larger in particle size than the paticulate material wherein the glass-ceramic media has a low thermal expansion coefficient and is readily soluable in silicate glass melts, with hot exhaust gases from said process;

introducing the hot media into one end of an inclined, rotatable container;

introducing particulate material into the other end of the container;

rotating the container, during rotation the material and media tumbling and moving over each other in opposite directions of the container while in heat transfer relationship; and discharging the material from said one end of the container and discharging the media from said other end of the container.

13. A method of heating or drying particulate material for use in a process resulting in hot exhaust gases including the steps of:

heating glass-ceramic heat transfer media, larger in particle size than the particulate material wherein the glass-ceramic media has a low thermal expansion coefficient and is readily soluable in silicate glass melts, with hot exhaust gases from said process;

introducing the hot media into one end of an inclined, rotatable container;

introducing particulate material into the other end of the container;

rotating the container, during rotation the material and media tumbling and moving over each other in opposite directions of the container while in heat transfer relationship; and discharging the material from said one end of the container and discharging the media from said other end of the container.

* * * * *